(12) United States Patent
Hsieh et al.

(10) Patent No.: US 10,919,464 B2
(45) Date of Patent: Feb. 16, 2021

(54) SUPERCAPACITOR POWER BUFFER FOR VEHICLE POWER SYSTEM

(71) Applicant: Lyft, Inc., San Francisco, CA (US)

(72) Inventors: Chen-yu Hsieh, San Jose, CA (US); Catalin Popovici, San Jose, CA (US)

(73) Assignee: Lyft, Inc., San Francisco, CA (US)

( * ) Notice: Subject to any disclaimer, the term of this patent is extended or adjusted under 35 U.S.C. 154(b) by 254 days.

(21) Appl. No.: 16/051,130

(22) Filed: Jul. 31, 2018

(65) Prior Publication Data

US 2020/0039454 A1     Feb. 6, 2020

(51) Int. Cl.
*B60R 16/023* (2006.01)
*B60R 16/033* (2006.01)
*B60L 50/40* (2019.01)

(52) U.S. Cl.
CPC .......... *B60R 16/0234* (2013.01); *B60L 50/40* (2019.02); *B60R 16/033* (2013.01); *B60L 2210/12* (2013.01); *B60L 2210/14* (2013.01)

(58) Field of Classification Search
None
See application file for complete search history.

(56) References Cited

U.S. PATENT DOCUMENTS

| 9,477,278 | B2* | 10/2016 | Shilimkar | H02M 3/158 |
| 9,494,940 | B1* | 11/2016 | Kentley | G05D 1/0255 |
| 2005/0068003 | A1* | 3/2005 | Gauthier | B60L 3/0046 320/104 |
| 2012/0181954 | A1 | 7/2012 | Gopalakrishnan et al. | |
| 2016/0164309 | A1* | 6/2016 | Bonafe' | H02J 7/007 320/167 |
| 2018/0083469 | A1* | 3/2018 | Bauer | F02N 11/0866 |

FOREIGN PATENT DOCUMENTS

KR   10-2017-0132124   12/2017
WO      2001071895       7/2012

* cited by examiner

*Primary Examiner* — Jared Fureman
*Assistant Examiner* — Joel Barnett
(74) *Attorney, Agent, or Firm* — Sheppard Mullin Richter & Hampton LLP (57) ABSTRACT

In general, one or more loads, such as a sensor suite of an autonomous (or semi-autonomous) vehicle, may be configured to draw power from a supercapacitor. A switching mechanism can selectively connect or disconnect the one or more loads and the supercapacitor from a voltage source of a vehicle power system. By systematically disconnecting the voltage source from the supercapacitor and the one or more loads, the exposure of the voltage source to the one or more loads is minimized. Accordingly, the exposure of the voltage source of the vehicle power system to potentially damaging short circuits or power surges that may arise in relation to the one or more loads can also be minimized.

19 Claims, 6 Drawing Sheets

```
┌─────────────────────────────────────────────────────────────────────┐
│ Determine that a supercapacitor connected to and powering an        │
│ autonomous vehicle sensor suite has been charged to an upper        │
│ threshold voltage                                                   │
│ 402                                                                 │
└─────────────────────────────────────────────────────────────────────┘
                                    │
                                    ▼
┌─────────────────────────────────────────────────────────────────────┐
│ Disconnect the autonomous vehicle sensor suite and the              │
│ supercapacitor from a voltage source based on the determining that  │
│ the supercapacitor has been charged to the upper threshold voltage  │
│ 404                                                                 │
└─────────────────────────────────────────────────────────────────────┘
                                    │
                                    ▼
┌─────────────────────────────────────────────────────────────────────┐
│ Determine that the supercapacitor has been discharged, at least in  │
│ part by the autonomous vehicle sensor suite, to a lower threshold   │
│ voltage                                                             │
│ 406                                                                 │
└─────────────────────────────────────────────────────────────────────┘
                                    │
                                    ▼
┌─────────────────────────────────────────────────────────────────────┐
│ Reconnect the autonomous vehicle sensor suite and the               │
│ supercapacitor to the voltage source based on the determining that  │
│ the supercapacitor has been discharged to the lower threshold       │
│ voltage                                                             │
│ 408                                                                 │
└─────────────────────────────────────────────────────────────────────┘
```

SUPERCAPACITOR POWER BUFFER FOR VEHICLE POWER SYSTEM

FIELD OF THE INVENTION

The present technology relates to the field of vehicle power systems. More particularly, the present technology relates to systems, apparatus, and methods for protecting vehicle power systems from potential electrical failures that may be caused by loads connected to the vehicle power systems.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

An embodiment of the present disclosure includes a vehicle system comprising a high-voltage voltage source configured to power a vehicle, a DC-to-DC converter configured to convert the high-voltage voltage source to a low-voltage voltage source or a current source, a supercapacitor configured to provide power to one or more loads, and a switching mechanism configured to selectively disconnect the one or more loads and the supercapacitor from the low-voltage voltage source or the current source.

In an embodiment, the switching mechanism comprises a buck converter.

In an embodiment, the buck converter comprises one or more MOSFETs for selectively disconnecting the one or more loads and the supercapacitor from the low-voltage voltage source or the current source.

In an embodiment, the switching mechanism comprises a pulse-width modulation (PWM) controller for controlling the one or more MOSFETs.

In an embodiment, the one or more MOSFETs comprise a high-side MOSFET. Turning on the high-side MOSFET connects the one or more loads and the supercapacitor to the low-voltage voltage source or the current source, and turning off the high-side MOSFET disconnects the one or more loads and the supercapacitor from the low-voltage voltage source or the current source.

In an embodiment, the PWM controller is configured to connect the one or more loads and the supercapacitor to the low-voltage voltage source or the current source when the supercapacitor is charged at a lower threshold level, and disconnect the one or more loads and the supercapacitor from the low-voltage voltage source or the current source when the supercapacitor is charged at an upper threshold level.

In an embodiment, the upper threshold level is approximately equal to a voltage of the low-voltage voltage source, and the lower threshold level is greater than a minimum voltage requirement of the one or more loads.

In an embodiment, the one or more loads comprise one or more sensors in an autonomous vehicle sensor suite.

In an embodiment, the high-voltage voltage source is approximately 275V, the low-voltage voltage source is approximately 12V, and the supercapacitor has a capacitance greater than or equal to 10 F.

An embodiment of the present disclosure includes a method comprising connecting a supercapacitor to a sensor suite of a vehicle and selectively disconnecting the sensor suite and the supercapacitor from a voltage source of the vehicle.

In an embodiment, the selectively disconnecting the sensor suite and the supercapacitor from a voltage source of the vehicle comprises determining that the supercapacitor has been charged to an upper threshold voltage and disconnecting the sensor suite and the supercapacitor from the voltage source based on the determining that the supercapacitor has been charged to the upper threshold voltage.

In an embodiment, the selectively disconnecting the sensor suite and the supercapacitor from a voltage source of the vehicle comprises determining that the supercapacitor has failed to charge to an upper threshold voltage within a threshold amount of time and disconnecting the sensor suite and the supercapacitor from the voltage source based on the determining that the supercapacitor has failed to charge to the upper threshold voltage within the threshold amount of time.

In an embodiment, the selectively disconnecting the sensor suite and the supercapacitor from a voltage source of the vehicle comprises determining that the supercapacitor has been discharged, at least in part by the sensor suite, to a lower threshold voltage and connecting the sensor suite and the supercapacitor to the voltage source based on the determining that the supercapacitor has been discharged, at least in part by the sensor suite, to the lower threshold voltage.

In an embodiment, the voltage source is a battery installed in an autonomous vehicle.

In an embodiment, the sensor suite and the supercapacitor are selectively disconnected from the voltage source using a switching mechanism.

In an embodiment, the switching mechanism comprises a buck converter.

In an embodiment, the buck converter comprises one or more MOSFETs for selectively disconnecting the sensor suite and the supercapacitor from the voltage source.

In an embodiment, the switching mechanism comprises a PWM controller for controlling the one or more MOSFETs.

In an embodiment, the one or more MOSFETs comprise a high-side MOSFET. Turning on the high-side MOSFET connects the sensor suite and the supercapacitor to the voltage source, and turning off the high-side MOSFET disconnects the sensor suite and the supercapacitor from the voltage source.

An embodiment of the present disclosure includes a vehicle system comprising a high-voltage voltage source configured to power an autonomous vehicle, a DC-to-DC converter configured to convert the high-voltage voltage source to a low-voltage voltage source or a current source, a supercapacitor configured to provide power to one or more sensors in an autonomous vehicle sensor suite installed on the autonomous vehicle, and a switching mechanism configured to selectively disconnect the one or more sensors and the supercapacitor from the low-voltage voltage source or the current source. The switching mechanism comprises a buck converter comprising a high-side MOSFET for selectively disconnecting the one or more sensors and the supercapacitor from the low-voltage voltage source or the current source. Turning on the high-side MOSFET connects the one or more sensors and the supercapacitor to the low-voltage voltage source or the current source, and turning off the high-side MOSFET disconnects the one or more sensors and the supercapacitor from the low-voltage voltage source or the current source. The switching mechanism also comprises a PWM controller for controlling the high-side MOSFET, wherein the PWM controller is configured to connect the one or more sensors and the supercapacitor to the low-voltage voltage source or the current source when the supercapacitor is charged at a lower threshold level, and disconnect the one or more sensors and the supercapacitor from the low-voltage voltage source or the current source when the supercapacitor is charged at an upper threshold level.

It should be appreciated that many other embodiments, features, applications, and variations of the disclosed technology will be apparent from the accompanying drawings and from the following detailed description. Additional and/or alternative implementations of the systems, methods, and non-transitory computer readable media described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the systems, methods, and non-transitory computer readable media illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Autonomous or semi-autonomous vehicles may be used by a transportation management system to provide ride services or other types of services. A transportation management system may comprise a fleet of autonomous or semi-autonomous vehicles. Each autonomous (or semi-autonomous) vehicle in the fleet may include one or more sensors in a sensor suite. Under conventional approaches, various loads, such as one or more sensors in a sensor suite, may be powered by connecting the loads to a voltage source of a vehicle power system. For example, one or more sensors in a sensor suite on an autonomous vehicle may be powered using a high-voltage battery in the autonomous vehicle. However, there may be instances in which such loads may experience or cause problematic electrical events, such as short circuits or power surges. In such scenarios, if the loads are connected to the voltage source of the vehicle power system, a short-circuit or a power surge may cause a significant failure of the vehicle power system, perhaps rendering the entire vehicle non-operational. Such events may also result in damage to the load/sensor suite, which can be expensive and time-intensive to replace, and may cause some vehicle downtime. Within the context of a fleet of autonomous or semi-autonomous vehicles providing services, non-operational vehicles undermine operational capacity of the fleet and represent a significant challenge to providing reliable service. Conventional approaches pose disadvantages in addressing these and other problems.

An improved approach in accordance with the present technology overcomes the foregoing and other disadvantages associated with conventional approaches. In general, one or more loads, such as a sensor suite of an autonomous (or semi-autonomous) vehicle, may be configured to draw power from a supercapacitor. A switching mechanism can be configured to selectively connect or disconnect the one or more loads and the supercapacitor from a voltage source of a vehicle power system. The supercapacitor and the one or more loads can be connected to the voltage source of the vehicle power system when the supercapacitor needs to be charged. Once the supercapacitor is charged to an upper threshold level, the supercapacitor and the one or more loads can be disconnected from the voltage source. The one or more loads can draw power from the charged supercapacitor. Once the supercapacitor reaches a lower threshold level, the supercapacitor can be reconnected to the voltage source of the vehicle power system to recharge. In an innovative, unconventional use of supercapacitors, the present technology can shield a vehicle power system from potentially damaging electrical events in relation to a load by utilizing the supercapacitor placed between the load and the vehicle power system. By systematically disconnecting the voltage source from the supercapacitor and the one or more loads, the exposure of the voltage source to the one or more loads is minimized. Accordingly, the exposure of the voltage source of the vehicle power system to potentially damaging short circuits or power surges that may arise in relation to the one or more loads can also be minimized. If a short circuit or power surge does occur, the one or more loads and the supercapacitor may be impacted or damaged. However, because the voltage source of the vehicle power system is not connected to the supercapacitor and the one or more loads at the time of such events, the voltage source and the vehicle power system can be protected, preserving the operational capability of the vehicle. More details relating to the disclosed technology are provided below.

Figure 1:
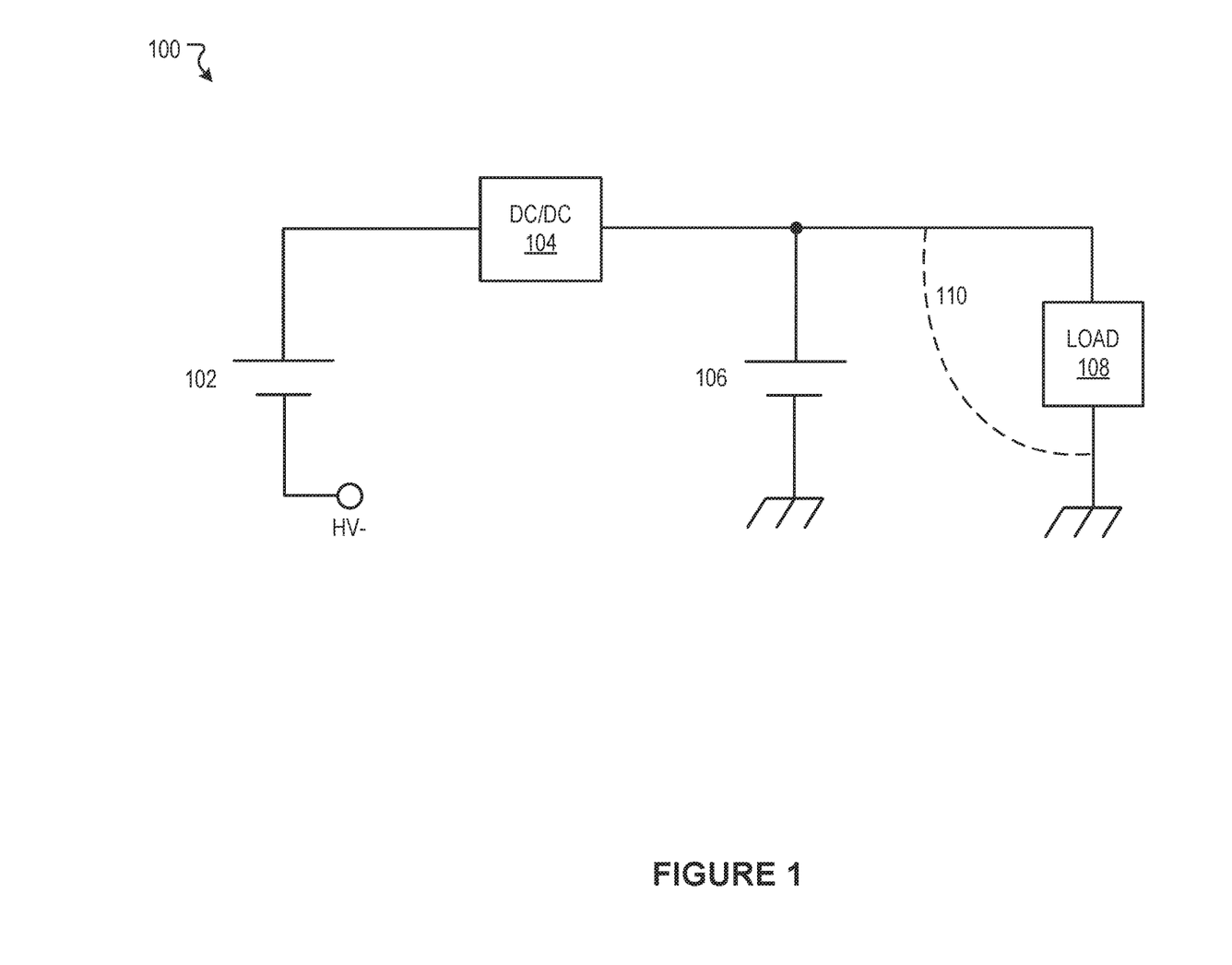
FIG. 1 illustrates a conventional arrangement in which a load is connected to a voltage source in a vehicle power system.

FIG. 1 illustrates an example conventional subsystem 100 of a vehicle power system. The conventional subsystem 100 includes a voltage source 102. The voltage source 102 may be, for example, a high voltage battery in the vehicle. A DC-to-DC converter 104 converts the voltage of the voltage source 102 to a lower voltage, as represented by a voltage source 106. The lower voltage may be used to power a load 108. However, if a short circuit is induced in relation to the load 108, such as a short circuit 110, voltage sources 106 and 102, or other related components, such as one or more fuses designed to protect the vehicle power system, may be at risk. If the vehicle power system is damaged as a result of the short circuit 110, the vehicle itself may become non-operational.

Figure 2:
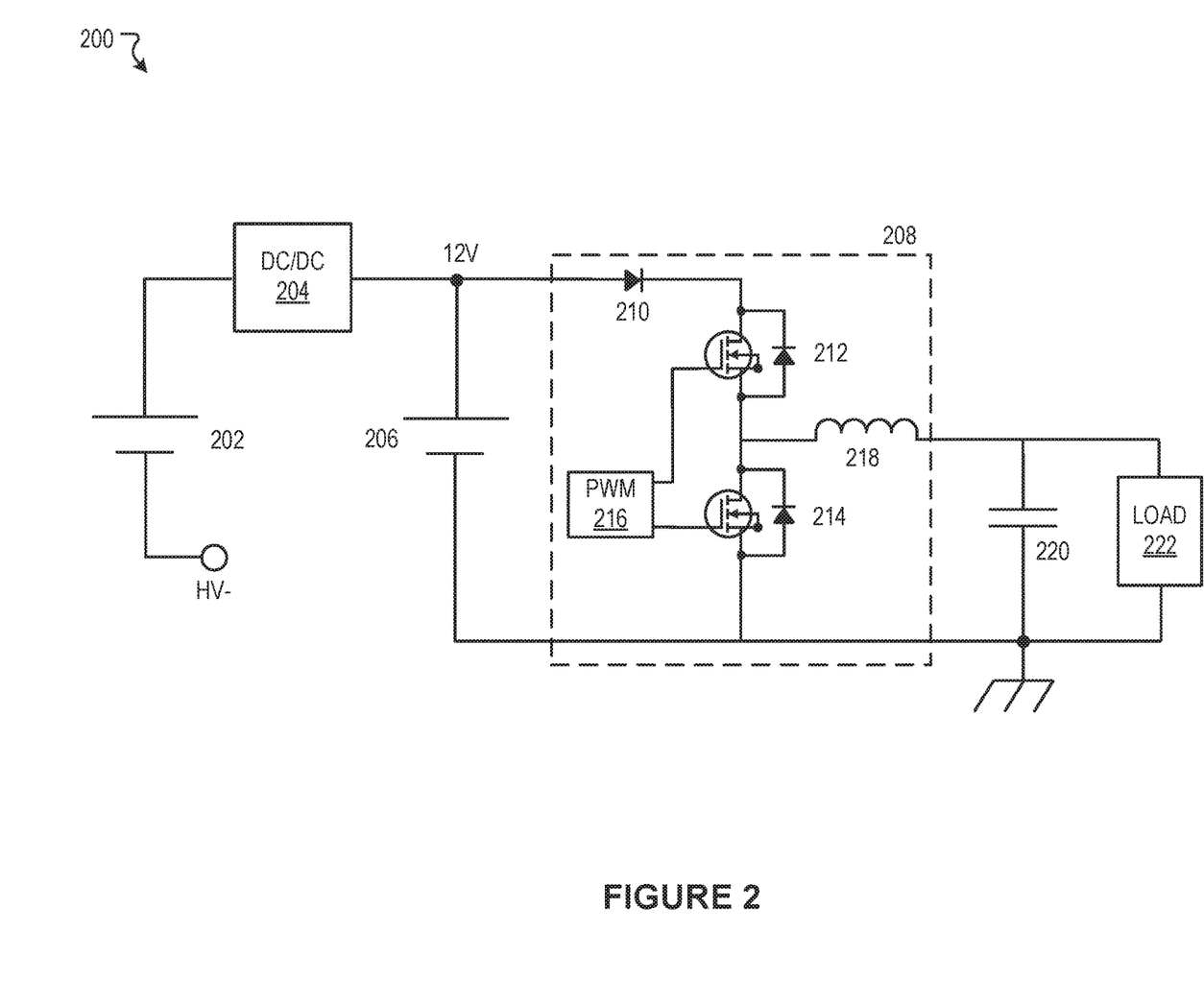
FIG. 2 illustrates an example subsystem of a vehicle power system connected to a supercapacitor, according to an embodiment of the present technology.
Figure 5:
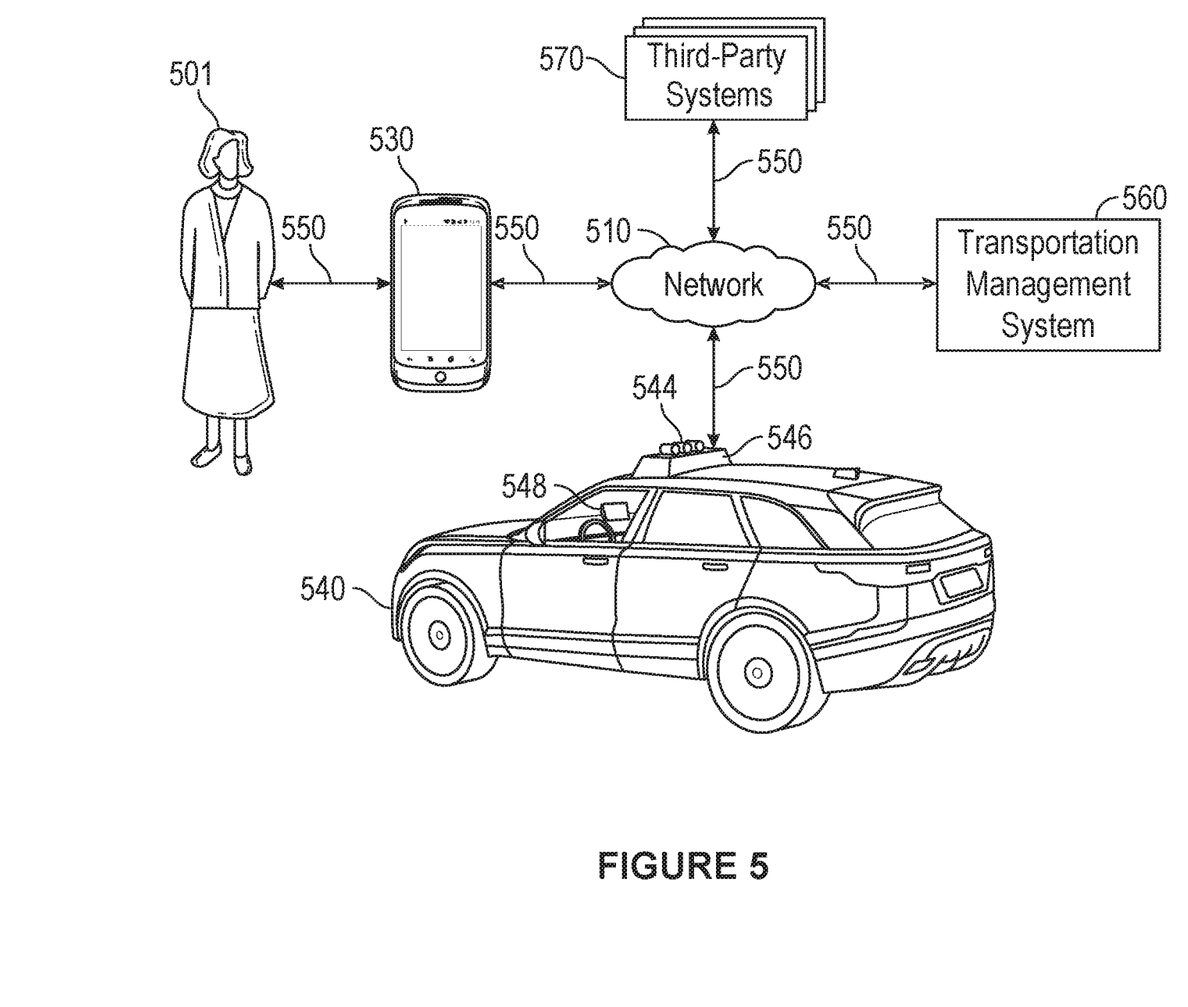
FIG. 5 illustrates an example block diagram of a transportation management environment for matching ride requestors with autonomous vehicles, according to an embodiment of the present technology.

FIG. 2 illustrates an example of a subsystem 200 of a vehicle power system of a vehicle, according to an embodiment of the present technology. The vehicle can be, for example, an autonomous vehicle 540 as shown in FIG. 5. In the depicted embodiment, the subsystem 200 includes a high-voltage voltage source 202. In an embodiment, the high-voltage voltage source 202 may be a high-voltage vehicle battery. For example the high-voltage voltage source 202 may be a 275 W battery installed within an autonomous vehicle. The subsystem 200 also includes a DC-to-DC converter 204 to convert the high-voltage voltage source 202 to a lower voltage, as represented by a low-voltage voltage source 206. In certain embodiments, the low-voltage voltage source 206 may be approximately 12V. The voltage source 202 and/or the voltage source 206 may be necessary for the vehicle to operate. In certain embodiments, the low-voltage voltage source 206 may be a current source 206 capable of providing a constant current.

The subsystem 200 includes a load 222 to be powered. The load 222 may include, for example, one or more sensors in an autonomous vehicle sensor suite. For example, the load 222 may include one or more sensors 544 installed on the autonomous vehicle 540 of FIG. 5. In the subsystem 200, rather than having the load 222 draw power directly from the voltages sources 202, 206, the load 222 is powered using a supercapacitor 220. The supercapacitor 220 and the load 222 are connected to the low-voltage power source 206 through a switching mechanism 208. The switching mechanism 208 selectively connects and disconnects the voltage sources 202, 206 from the supercapacitor 220 and the load 222. When the voltage sources 202, 206 are disconnected from the load 222, the voltage sources 202, 206 or related components (e.g., fuses) are shielded from potential short circuits or power surges related to the load 222 that may render the vehicle inoperable.

In the example embodiment, the switching mechanism 208 is implemented using a buck converter. However, in other embodiments, other switching mechanisms can implement other switching converters, such as a buck-boost converter. The buck converter includes a diode 210, a first switch implemented in the example embodiment using a high-side MOSFET 212, a second switch implemented in the example embodiment using a low-side MOSFET 214, and an inductor 218. The switching mechanism 208 also includes a controller implemented in the example embodiment using a PWM (pulse-width modulation) controller 216. While certain components (e.g., buck converter, transistors, controller, etc.) are depicted in the example embodiment illustrated in FIG. 2, additional, alternative, or fewer components may be used in other embodiments in accordance with the present technology. The PWM controller 216 can be configured to selectively turn the MOSFETs 212, 214 on or off. In an embodiment, the high-side MOSFET 212 and the low-side MOSFET 214 may have opposite states, such that when the high-side MOSFET 212 is on, the low-side MOSFET 214 is off, and when the high-side MOSFET 212 is off, the low-side MOSFET 214 is on. In the depicted embodiment, when the high-side MOSFET 212 is turned on, current is able to flow from the voltage source 206 to the supercapacitor 220, thereby charging the supercapacitor 220. When the high-side MOSFET 212 is turned off, current no longer flows to the supercapacitor 220 and the supercapacitor 220 stops charging. The load 222, connected in parallel to the supercapacitor 220, can continue to draw power from the charged supercapacitor 220.

The PWM controller 216 can be configured to control the switching mechanism 208 to selectively connect and disconnect the supercapacitor 220 and the load 222 from the voltage source 206. In the example embodiment, this selective connecting and disconnecting of the supercapacitor 220 and the load 222 from the voltage source 206 may be performed by controlling the MOSFETs 212, 214. The high-side MOSFET 212 can be turned on to allow the supercapacitor 220 to charge. When the supercapacitor 220 is charged to an upper threshold level, the PWM controller 216 can be configured to turn off the high-side MOSFET 212, disconnecting the voltage sources 202, 206 from the supercapacitor 220 and the load 222. The upper threshold level may approximate or approach the voltage of the low-voltage source 206. For example, if the low-voltage voltage source 206 is approximately 12V, the upper threshold level can be, for example, approximately 10V, 10.5V, 11V, 11.5V, or 12V. The charged supercapacitor 220 can provide power to the load 222.

As the supercapacitor 220 powers the load 222, the charge on the supercapacitor 220 will gradually decrease. When the charge on the supercapacitor 220 falls below a lower threshold level, the PWM controller 216 can be configured to turn on the high-side MOSFET 212 to allow the supercapacitor 220 to recharge. The lower threshold level may approximate or approach a minimum charge required to power the load 222. For example, if the load 222 requires between 1.5 to 2V, the lower threshold level can be set to approximately 2V, 2.5V, or 3V. Each time the supercapacitor 220 is charged to satisfy the upper threshold level, the supercapacitor 220 and the load 222 can be disconnected from the voltage source 206, and each time the supercapacitor 220 is discharged to satisfy the lower threshold level, the supercapacitor 220 and the load 222 can be re-connected to the voltage source 206. In this way, the load 222 receives continuous power from the supercapacitor 220, but the voltage sources 202, 206 are only intermittently connected to the supercapacitor 220 and the load 222. In an embodiment, charging of the supercapacitor 220 may require only a short time, such as approximately 50 ms. In certain embodiments, the supercapacitor 220 can have a capacitance of greater than or equal to 10 F, and discharge of the charged supercapacitor 220 may occur over a relatively larger period of time on the order of minutes or hours.

As discussed above, the subsystem 200 provides the advantageous effect that when the voltage sources 202, 206 are disconnected from the load 222, the voltage sources 202, 206 and other important vehicle power system components may be shielded from potential short circuits or power surges that may arise in relation to the load 222. As also mentioned above, the time to charge the supercapacitor 220, i.e., the time during which the voltage sources 202, 206 are connected to the supercapacitor 220 and the load 222, may be relatively short (e.g., approximately 50 ms), while the time during which the voltage sources 202, 206 are disconnected from the supercapacitor 220 and the load 222 may be relatively longer (e.g., on the order of minutes or hours). As such, the risk of a short circuit or power surge in relation to the load 222 rendering the entire vehicle inoperable is substantially minimized. The subsystem 200 provides the additional significant advantage of identifying potential faults or failures in the supercapacitor 220 and/or the load 222. As mentioned above, the time required to charge the supercapacitor 220 should be predictable and relatively short. If the PWM controller 216 attempts to charge the supercapacitor 220, but the supercapacitor 220 fails to charge to the upper threshold level within a selected time duration (e.g., one second), it can be determined that there is a problem with the supercapacitor 220 and/or the load 222, and the PWM controller 216 can disconnect the voltage sources 202, 206 from the supercapacitor 220 and the load 222. In certain embodiments, if the vehicle is an autonomous (or semi-autonomous) vehicle and a problem is detected, the vehicle can take action to, for example, safely stop the vehicle or move the vehicle to the side of the road for needed remediation or repair.

Figure 3:
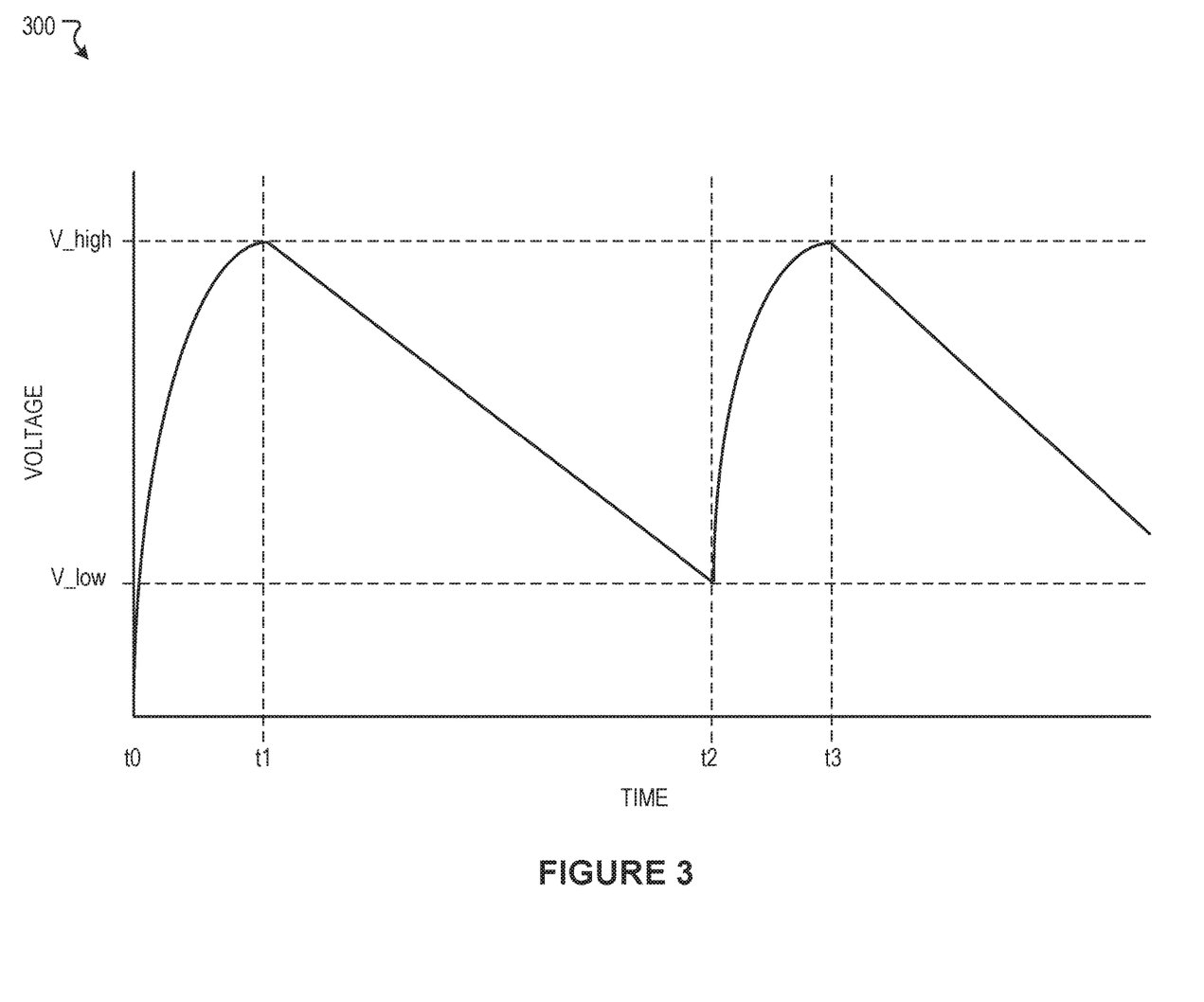
FIG. 3 illustrates a graph depicting an example of a supercapacitor buffer being charged and discharged, according to an embodiment of the present technology.

FIG. 3 illustrates an example timing graph 300 depicting charging and discharging of the supercapacitor 220, according to an embodiment of the present technology. At time t0, the supercapacitor 220 has zero charge. From time t0 to time t1, the supercapacitor 220 is charged from zero to an upper threshold level, V_high. This may correspond, for example, to a vehicle being started. As discussed above, the supercapacitor 220 may be charged by connecting the supercapacitor 220 to a voltage source (e.g., voltage sources 202, 206), such as a battery in a vehicle. In the embodiment depicted in FIG. 2, connecting the supercapacitor 220 to the voltage source also connects a load (e.g., load 222) to the voltage source. As also discussed above, the time to charge the supercapacitor may be relatively short, such as approximately 50 ms. Once the supercapacitor 220 has been charged to the upper threshold level, the supercapacitor 220 and the load 222 are disconnected from the voltage sources 202, 206. While the supercapacitor 220 and the load 222 are disconnected from the voltage sources 202, 206, the vehicle power system is substantially shielded from potential power surges or short circuits related to the load 222, such as a sensor suite, connected to the supercapacitor 220. As the supercapacitor 220 continues to power the load 222, the charge on the supercapacitor 220 gradually decreases from time t1 to time t2. As discussed above, the duration from time t1 to time t2 may be relatively long, such as on the order of minutes to hours, depending on the energy storage capabilities of the supercapacitor 220. Once the charge on the supercapacitor 220 decreases to a lower threshold level, V_low, the supercapacitor 220 and the load 222 are reconnected to the voltage sources 202, 206 to recharge the supercapacitor 220. The supercapacitor 220 recharges from time t2 to time t3, at which point the supercapacitor 220 and the load 222 are once again disconnected from the voltage sources 202, 206, shielding the voltage sources 202, 206 from potential short circuits or power surges that may arise in relation to the load 222, and the charge on the supercapacitor 220 once again begins to decrease.

Figure 4:
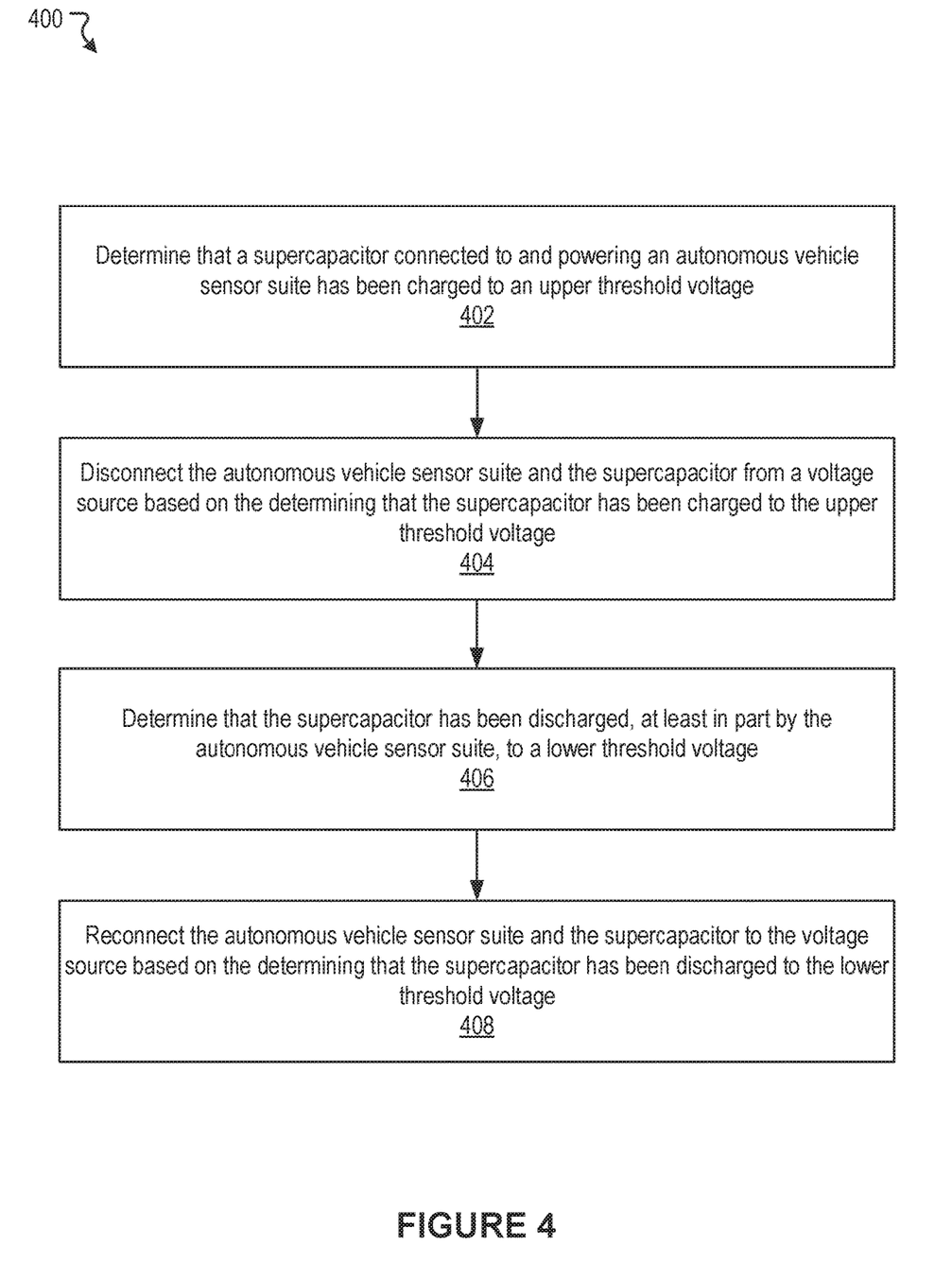
FIG. 4 illustrates an example method, according to an embodiment of the present technology.

FIG. 4 illustrates an example method 400, according to an embodiment of the present technology. At block 402, the method 400 can determine that a supercapacitor connected to and powering an autonomous vehicle sensor suite has been charged to an upper threshold voltage. At block 404, the method 400 can disconnect the autonomous vehicle sensor suite and the supercapacitor from a voltage source based on the determining that the supercapacitor has been charged to the upper threshold voltage. At block 406, the method 400 can determine that the supercapacitor has been discharged, at least in part by the autonomous vehicle sensor suite, to a lower threshold voltage. At block 408, the method 400 can reconnect the autonomous vehicle sensor suite and the supercapacitor to the voltage source based on the determining that the supercapacitor has been discharged to the lower threshold voltage. Many variations to the example method are possible. It should be appreciated that there can be additional, fewer, or alternative steps performed in similar or alternative orders, or in parallel, within the scope of the various embodiments discussed herein unless otherwise stated.

FIG. 5 illustrates an example block diagram of a transportation management environment for matching ride requestors with autonomous vehicles. In particular embodiments, the environment may include various computing entities, such as a user computing device 530 of a user 501 (e.g., a ride provider or requestor), a transportation management system 560, an autonomous (or semi-autonomous) vehicle 540, and one or more third-party systems 570. The computing entities may be communicatively connected over any suitable network 510. As an example and not by way of limitation, one or more portions of network 510 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 5 illustrates a single user device 530, a single transportation management system 560, a single vehicle 540, a plurality of third-party systems 570, and a single network 510, this disclosure contemplates any suitable number of each of these entities. As an example and not by way of limitation, the network environment may include multiple users 501, user devices 530, transportation management systems 560, autonomous-vehicles 540, third-party systems 570, and networks 510.

The user device 530, transportation management system 560, autonomous vehicle 540, and third-party system 570 may be communicatively connected or co-located with each other in whole or in part. These computing entities may communicate via different transmission technologies and network types. For example, the user device 530 and the vehicle 540 may communicate with each other via a cable or short-range wireless communication (e.g., Bluetooth, NFC, WI-FI, etc.), and together they may be connected to the Internet via a cellular network that is accessible to either one of the devices (e.g., the user device 530 may be a smartphone with LTE connection). The transportation management system 560 and third-party system 570, on the other hand, may be connected to the Internet via their respective LAN/WLAN networks and Internet Service Providers (ISP). FIG. 5 illustrates transmission links 550 that connect user device 530, autonomous vehicle 540, transportation management system 560, and third-party system 570 to communication network 510. This disclosure contemplates any suitable transmission links 550, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 550 may connect to one or more networks 510, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 550. For example, the user device 530 may communicate with the transportation management system via a cellular network and the Internet, but communicate with the autonomous vehicle 540 via Bluetooth or a physical wire connection.

In particular embodiments, the transportation management system 560 may fulfill ride requests for one or more users 501 by dispatching suitable vehicles. The transportation management system 560 may receive any number of ride requests from any number of ride requestors 501. In particular embodiments, a ride request from a ride requestor 501 may include an identifier that identifies the ride requestor in the system 560. The transportation management system 560 may use the identifier to access and store the ride requestor's 501 information, in accordance with the requestor's 501 privacy settings. The ride requestor's 501 information may be stored in one or more data stores (e.g., a relational database system) associated with and accessible to the transportation management system 560. In particular embodiments, ride requestor information may include profile information about a particular ride requestor 501. In particular embodiments, the ride requestor 501 may be associated with one or more categories or types, through which the ride requestor 501 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 560 may classify a user 501 based on known information about the user 501 (e.g., using machine-learning classifiers), and use the classification to retrieve relevant aggregate information associated with that class. For example, the system 560 may classify a user 501 as a young adult and retrieve relevant aggregate information associated with young adults, such as the type of music generally preferred by young adults.

Transportation management system 560 may also store and access ride information. Ride information may include locations related to the ride, traffic data, route options, optimal pick-up or drop-off locations for the ride, or any other suitable information associated with a ride. As an example and not by way of limitation, when the transportation management system 560 receives a request to travel from San Francisco International Airport (SFO) to Palo Alto, Calif., the system 560 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 560. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 560. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 560 in particular embodiments may predict and provide ride suggestions in response to a ride request. In particular embodiments, the system 560 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 560 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 560 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 530 (which may belong to a ride requestor or provider), a transportation management system 560, vehicle system 540, or a third-party system 570 to process, transform, manage, retrieve, modify, add, or delete the information stored in the data store.

In particular embodiments, transportation management system 560 may include an authorization server (or any other suitable component(s)) that allows users 501 to opt-in to or opt-out of having their information and actions logged, recorded, or sensed by transportation management system 560 or shared with other systems (e.g., third-party systems 570). In particular embodiments, a user 501 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 501 of transportation management system 560 through blocking, data hashing, anonymization, or other suitable techniques as appropriate.

In particular embodiments, third-party system 570 may be a network-addressable computing system that may provide HD maps or host GPS maps, customer reviews, music or content, weather information, or any other suitable type of information. Third-party system 570 may generate, store, receive, and send relevant data, such as, for example, map data, customer review data from a customer review website, weather data, or any other suitable type of data. Third-party system 570 may be accessed by the other computing entities of the network environment either directly or via network 510. For example, user device 530 may access the third-party system 570 via network 510, or via transportation management system 560. In the latter case, if credentials are required to access the third-party system 570, the user 501 may provide such information to the transportation management system 560, which may serve as a proxy for accessing content from the third-party system 570.

In particular embodiments, user device 530 may be a mobile computing device such as a smartphone, tablet computer, or laptop computer. User device 530 may include one or more processors (e.g., CPU and/or GPU), memory, and storage. An operating system and applications may be installed on the user device 530, such as, e.g., a transportation application associated with the transportation management system 560, applications associated with third-party systems 570, and applications associated with the operating system. User device 530 may include functionality for determining its location, direction, or orientation, based on integrated sensors such as GPS, compass, gyroscope, or accelerometer. User device 530 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 530 may also include one or more cameras, scanners, touchscreens, microphones, speakers, and any other suitable input-output devices.

In particular embodiments, the vehicle 540 may be an autonomous vehicle and equipped with an array of sensors 544, a navigation system 546, and a ride-service computing device 548. In particular embodiments, a fleet of autonomous vehicles 540 may be managed by the transportation management system 560. The fleet of autonomous vehicles 540, in whole or in part, may be owned by the entity associated with the transportation management system 560, or they may be owned by a third-party entity relative to the transportation management system 560. In either case, the transportation management system 560 may control the operations of the autonomous vehicles 540, including, e.g., dispatching select vehicles 540 to fulfill ride requests, instructing the vehicles 540 to perform select operations (e.g., head to a service center or charging/fueling station, pull over, stop immediately, self-diagnose, lock/unlock compartments, change music station, change temperature, and any other suitable operations), and instructing the vehicles 540 to enter select operation modes (e.g., operate normally, drive at a reduced speed, drive under the command of human operators, and any other suitable operational modes).

In particular embodiments, the autonomous vehicles 540 may receive data from and transmit data to the transportation management system 560 and the third-party system 570. Examples of received data may include, e.g., instructions, new software or software updates, maps, 3D models, trained or untrained machine-learning models, location information (e.g., location of the ride requestor, the autonomous vehicle 540 itself, other autonomous vehicles 540, and target destinations such as service centers), navigation information, traffic information, weather information, entertainment content (e.g., music, video, and news) ride requestor information, ride information, and any other suitable information. Examples of data transmitted from the autonomous vehicle 540 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 540, passengers may send/receive data to the transportation management system 560 and/or third-party system 570), and any other suitable data.

In particular embodiments, autonomous vehicles 540 may also communicate with each other as well as other traditional human-driven vehicles, including those managed and not managed by the transportation management system 560. For example, one vehicle 540 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 560 or third-party system 570).

In particular embodiments, an autonomous vehicle 540 may obtain and process sensor/telemetry data. Such data may be captured by any suitable sensors. For example, the vehicle 540 may have a Light Detection and Ranging (LiDAR) sensor array of multiple LiDAR transceivers that are configured to rotate 360°, emitting pulsed laser light and measuring the reflected light from objects surrounding vehicle 540. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 540. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 540 may have optical cameras pointing in different directions. The cameras may be used for, e.g., recognizing roads, lane markings, street signs, traffic lights, police, other vehicles, and any other visible objects of interest. To enable the vehicle 540 to "see" at night, infrared cameras may be installed. In particular embodiments, the vehicle may be equipped with stereo vision for, e.g., spotting hazards such as pedestrians or tree branches on the road. As another example, the vehicle 540 may have radars for, e.g., detecting other vehicles and/or hazards afar. Furthermore, the vehicle 540 may have ultrasound equipment for, e.g., parking and obstacle detection. In addition to sensors enabling the vehicle 540 to detect, measure, and understand the external world around it, the vehicle 540 may further be equipped with sensors for detecting and self-diagnosing the vehicle's own state and condition. For example, the vehicle 540 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 540 may build a 3D model of its surrounding based on data from its LiDAR, radar, sonar, and cameras, along with a pre-generated map obtained from the transportation management system 560 or the third-party system 570. Although sensors 544 appear in a particular location on autonomous vehicle 540 in FIG. 5, sensors 544 may be located in any suitable location in or on autonomous vehicle 540. Example locations for sensors include the front and rear bumpers, the doors, the front windshield, on the side panel, or any other suitable location.

In particular embodiments, the autonomous vehicle 540 may be equipped with a processing unit (e.g., one or more CPUs and GPUs), memory, and storage. The vehicle 540 may thus be equipped to perform a variety of computational and processing tasks, including processing the sensor data, extracting useful information, and operating accordingly. For example, based on images captured by its cameras and a machine-vision model, the vehicle 540 may identify particular types of objects captured by the images, such as pedestrians, other vehicles, lanes, curbs, and any other objects of interest.

In particular embodiments, the autonomous vehicle 540 may have a navigation system 546 responsible for safely navigating the autonomous vehicle 540. In particular embodiments, the navigation system 546 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 546 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 546 may use its determinations to control the vehicle 540 to operate in prescribed manners and to guide the autonomous vehicle 540 to its destinations without colliding into other objects. Although the physical embodiment of the navigation system 546 (e.g., the processing unit) appears in a particular location on autonomous vehicle 540 in FIG. 5, navigation system 546 may be located in any suitable location in or on autonomous vehicle 540. Example locations for navigation system 546 include inside the cabin or passenger compartment of autonomous vehicle 540, near the engine/battery, near the front seats, rear seats, or in any other suitable location.

In particular embodiments, the autonomous vehicle 540 may be equipped with a ride-service computing device 548, which may be a tablet or any other suitable device installed by transportation management system 560 to allow the user to interact with the autonomous vehicle 540, transportation management system 560, other users 501, or third-party systems 570. In particular embodiments, installation of ride-service computing device 548 may be accomplished by placing the ride-service computing device 548 inside autonomous vehicle 540, and configuring it to communicate with the vehicle 540 via a wired or wireless connection (e.g., via Bluetooth). Although FIG. 5 illustrates a single ride-service computing device 548 at a particular location in autonomous vehicle 540, autonomous vehicle 540 may include several ride-service computing devices 548 in several different locations within the vehicle. As an example and not by way of limitation, autonomous vehicle 540 may include four ride-service computing devices 548 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 548 may be detachable from any component of autonomous vehicle 540. This may allow users to handle ride-service computing device 548 in a manner consistent with other tablet computing devices. As an example and not by way of limitation, a user may move ride-service computing device 548 to any location in the cabin or passenger compartment of autonomous vehicle 540, may hold ride-service computing device 548, or handle ride-service computing device 548 in any other suitable manner. Although this disclosure describes providing a particular computing device in a particular manner, this disclosure contemplates providing any suitable computing device in any suitable manner.

Figure 6:
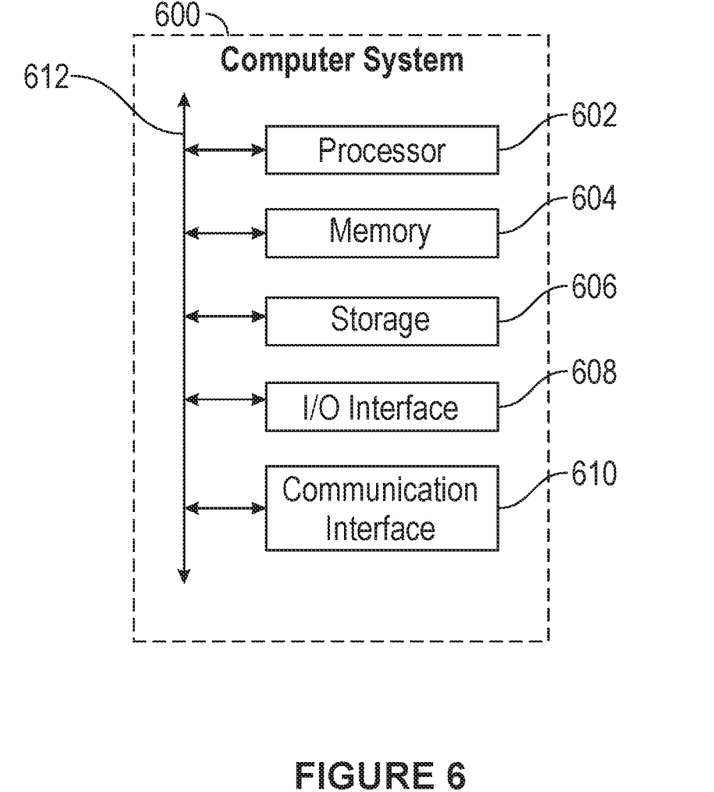
FIG. 6 illustrates an example of a computing system or computing device that can be utilized in various scenarios, according to an embodiment of the present technology.

FIG. 6 illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A vehicle system comprising:
    a high-voltage voltage source configured to power a vehicle;
    a DC-to-DC converter configured to convert the high-voltage voltage source to a low-voltage voltage source or a current source;
    a supercapacitor configured to provide power to one or more loads; and
    a switching mechanism comprising a controller that is configured to:
        connect the one or more loads and the supercapacitor to the low-voltage voltage source or the current source when the supercapacitor is charged at a first threshold level, and
        disconnect the one or more loads and the supercapacitor from the low-voltage voltage source or the current source when the supercapacitor is charged at a second threshold level greater than the first threshold level.

2. The vehicle system of claim 1, wherein the switching mechanism comprises a buck converter.

3. The vehicle system of claim 2, wherein the buck converter comprises one or more MOSFETs for selectively disconnecting the one or more loads and the supercapacitor from the low-voltage voltage source or the current source.

4. The vehicle system of claim 3, wherein the controller is a pulse-width modulation (PWM) controller, and the switching mechanism is configured to control the one or more MOSFETs based on the PWM controller.

5. The vehicle system of claim 4, wherein
    the one or more MOSFETs comprise a high-side MOSFET,
    turning on the high-side MOSFET connects the one or more loads and the supercapacitor to the low-voltage voltage source or the current source, and
    turning off the high-side MOSFET disconnects the one or more loads and the supercapacitor from the low-voltage voltage source or the current source.

6. The vehicle system of claim 1, wherein
    the second threshold level is approximately equal to a voltage of the low-voltage voltage source; and
    the first threshold level is greater than a minimum voltage requirement of the one or more loads.

7. The vehicle system of claim 1, wherein the one or more loads comprise one or more sensors in a vehicle sensor suite.

8. The vehicle system of claim 1, wherein the high-voltage voltage source is approximately 275V, the low-voltage voltage source is approximately 12V, and the supercapacitor has a capacitance greater than or equal to 10 F.

9. The vehicle system of claim 1, wherein, after the supercapacitor is charged at the second threshold level and the supercapacitor is disconnected from the low-voltage voltage source, the supercapacitor is discharged until the supercapacitor reaches the first threshold level.

10. A method comprising:
    connecting a supercapacitor and a load of a vehicle to a voltage source associated with the vehicle;
    determining that the supercapacitor has failed to charge to a threshold voltage within a threshold amount of time; and
    disconnecting the load and the supercapacitor from the voltage source based on the determining that the supercapacitor has failed to charge to the threshold voltage within the threshold amount of time.

11. The method of claim 10, further comprising:
    determining that the supercapacitor has been charged to the threshold voltage; and
    disconnecting the load and the supercapacitor from the voltage source based on the determining that the supercapacitor has been charged to the threshold voltage.

12. The method of claim 10, further comprising:
    determining that the supercapacitor has been discharged, at least in part by the load, to a second threshold voltage less than the threshold voltage; and
    connecting the load and the supercapacitor to the voltage source based on the determining that the supercapacitor has been discharged, at least in part by the load, to the second threshold voltage.

13. The method of claim 10, wherein the voltage source is connected to a battery installed in a vehicle.

14. The method of claim 10, wherein the load and the supercapacitor are selectively disconnected from the voltage source using a switching mechanism.

15. The method of claim 14, wherein the switching mechanism comprises a buck converter.

16. The method of claim 15, wherein the buck converter comprises one or more MOSFETs for selectively disconnecting the Gcnsor suitcload and the supercapacitor from the voltage source.

17. The method of claim 16, wherein the switching mechanism comprises a pulse-width modulation (PWM) controller for controlling the one or more MOSFETs.

18. The method of claim 16, wherein
    the one or more MOSFETs comprise a high-side MOSFET,
    turning on the high-side MOSFET connects the load and the supercapacitor to the voltage source, and
    turning off the high-side MOSFET disconnects the load and the supercapacitor from the voltage source.

19. A vehicle system comprising:
    a high-voltage voltage source configured to power a vehicle;
    a DC-to-DC converter configured to convert the high-voltage voltage source to a low-voltage voltage source or a current source;
    a supercapacitor configured to provide power to one or more sensors in a vehicle sensor suite installed on the vehicle; and
    a switching mechanism configured to selectively disconnect the one or more sensors and the supercapacitor from the low-voltage voltage source or the current source, wherein the switching mechanism comprises:

a MOSFET for selectively disconnecting the one or more sensors and the supercapacitor from the low-voltage voltage source or the current source, wherein:
  turning on the MOSFET connects the one or more sensors and the supercapacitor to the low-voltage voltage source or the current source, and
  turning off the high side MOSFET disconnects the one or more sensors and the supercapacitor from the low-voltage voltage source or the current source, and
a controller for controlling the MOSFET, wherein the controller is configured to:
  connect the one or more sensors and the supercapacitor to the low-voltage voltage source or the current source when the supercapacitor is charged at a first threshold level, and
  disconnect the one or more sensors and the supercapacitor from the low-voltage voltage source or the current source when the supercapacitor is charged at a second threshold level greater than the first threshold level.

\* \* \* \* \*